Oct. 9, 1934.                 W. S. WILLIAMS                 1,976,676
                    CONVEYER FOR USE IN MINES OR OTHERWISE
                       Filed July 8, 1931      2 Sheets-Sheet 1

William S. Williams
           INVENTOR.
By Chas. Lenegre
           ATTORNEY

Oct. 9, 1934.    W. S. WILLIAMS    1,976,676
CONVEYER FOR USE IN MINES OR OTHERWISE
Filed July 8, 1931    2 Sheets-Sheet 2

William S. Williams
INVENTOR.
BY Chas. Denegre
ATTORNEY

Patented Oct. 9, 1934

1,976,676

UNITED STATES PATENT OFFICE 1,976,676

CONVEYER FOR USE IN MINES OR OTHERWISE

William S. Williams, Coleanor, Ala., assignor of one-tenth to Charles Denegre, Birmingham, Ala.

Application July 8, 1931, Serial No. 549,368

1 Claim. (Cl. 198—220)

This invention relates to conveyers for conveying any kind of suitable material but especially for use in coal mines. The problem of reducing the cost in coal mining is principally one of reducing the cost of manual labor spent on transporting the coal from the working face to the railroad car. The shaker type of conveyer has proved the most satisfactory of all conveyers yet designed. It is different in that the whole trough is mounted on ball bearing supports, whereas in the endless chain type the trough remains stationary and the endless chain carries the flights along in the trough. In the shaker type the motion of the material on the conveyer is a sliding motion produced as follows: in the forward stroke of about eight to ten inches the conveyer trough proceeds at a relatively slow speed but the backward stroke is rather sudden and fast. The present invention has no connection with the shaker type of conveyer except to make use of its movement to operate the present invention and to work in conjunction with it. For this reason it is necessary to understand the main features of the shaker conveyer so as to better comprehend the present invention which is an auxiliary conveyer to the shaker conveyer, and with means or mechanism whereby the mentioned forward and backward movement of a shaker conveyer is utilized to produce a forward movement in the auxiliary conveyer of the endless chain type, the same being connected and operated either from the side or at the loading or discharging end of a shaker conveyer.

Figure 1:
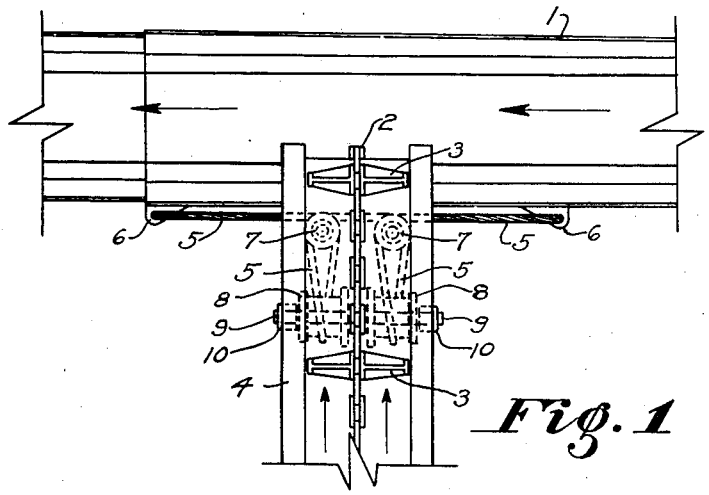
Figure 2:
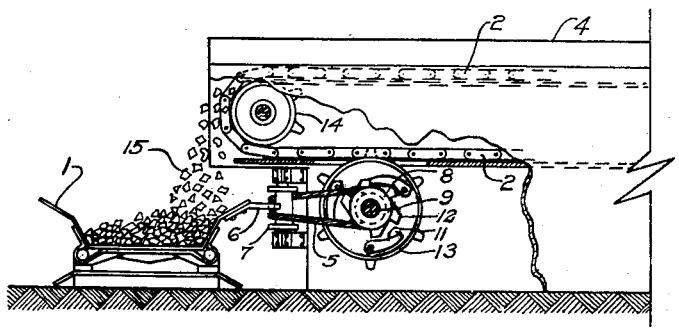
Figure 3:
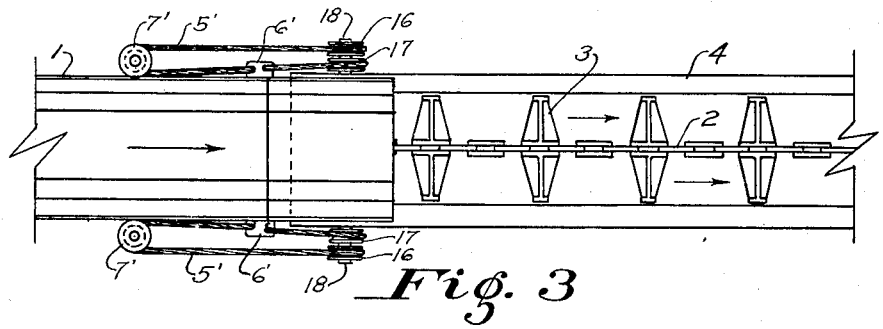
Figure 4:
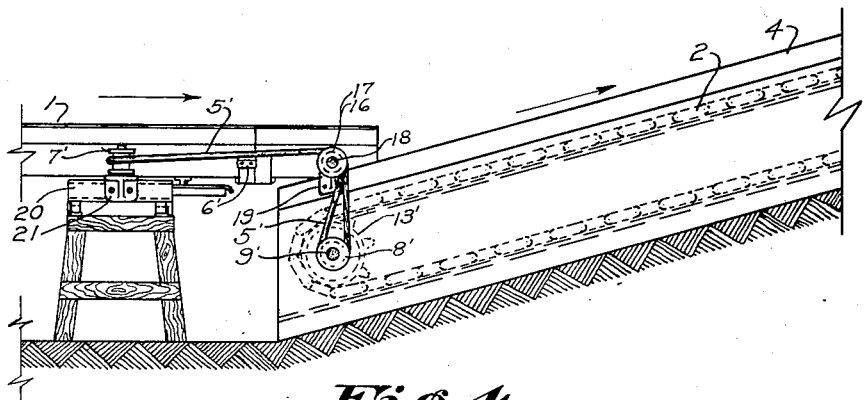
Figure 5:
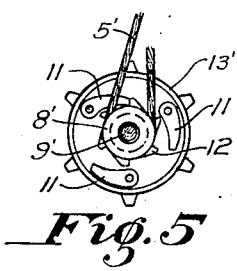
Figure 6:
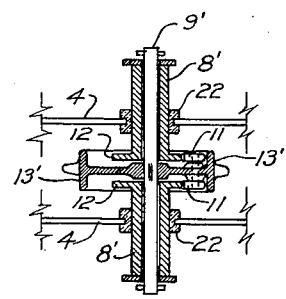

I attain the object by means or mechanism illustrated in the accompanying drawings in which Fig. 1 is a plan view of part of a shaker conveyer discharging in direction of arrows and the discharging end of an auxiliary forward (only) moving ordinary chain type conveyer in position to dump its load into the shaker conveyer. The means or mechanism to produce the forward movement in the chain conveyer also shown. Fig. 2 is a vertical view of the same parts in Fig. 1 looking toward the arrow points, with the addition in Fig. 2 coal is shown falling out of the chain conveyer into the shaker conveyer. Fig. 3 is a plan view of the discharging end of a shaker conveyer unloading in direction of arrow into the auxiliary chain conveyer so placed as to receive the load. Fig. 4 is a vertical side view of the same parts in Fig. 3. Fig. 5 is a vertical view of the ratchet mechanism employed. Fig. 6 is a plan sectional view through the center of the ratchet mechanism employed.

Similar numerals refer to similar parts throughout the several views.

In Fig. 1, 1 represents the trough of a shaker conveyer; 2 represents a sprocket chain; 3 represents a flight; 4 represents the side member of a trough of the chain conveyer; 5 represents a wire cable; 6 represents attachment to side of trough; 7 represents pulley; 8 represents drum; 9 represents shaft; 10 represents bearing. In Fig. 2, 11 represents pawl; 12 represents ratchet sprocket; 13 represents driving sprocket; 14 represents chain sprocket; 15 represents coal. In Fig. 3, 16 and 17 represent pulleys at the sides instead of under the conveyer trough; 18 represents shafts of the pulleys; 19 represents supporting arms or brackets for shafts; 5' represents cable; 6' represents arm on conveyer trough; 7' represents pulley on support of conveyer trough. In Fig. 4, 20 represents top of support of conveyer trough; 21 represents bracket. In Fig. 5 all parts are obvious. In Fig. 6, 22 represents bearings.

With the parts identified I now explain the operation.

In Fig. 1, 1 has a slow stroke movement in direction of arrow of about eight or ten inches and a reverse quick movement the same distance. When it so moves it actuates cable 5 that is fastened to 1 at 6, 6. Cable 5 passes around pulleys 7, 7 and around drums 8, 8. Cable 5 is made secure to drums 8, 8 by any suitable means such as a clamp in the shape of a U that will straddle the cable and go through the face of the drum to prevent slippage or cable 5 may be carried around drums 8, 8 several times and in this manner secure a grip without any other fastening means to prevent slippage. The clamp is to be fastened at a point in the center lengthwise of that portion of the cable surrounding the drum so as to allow the drum to move or rotate without putting any strain on the clamp in so far as pulling it loose from the drum. Also the cable may be looped around the drum two or three times and the clamp attached to hold the cable in case the frictional contact is not sufficient. Fastened to or made a part of drums 8, 8 are ratchet sprockets 12 in Fig. 2. When the slow stroke occurs the drums are rolled by cable 5 pull in the direction to cause ratchet mechanism 11, 12 in Fig. 2 to operate chain sprocket 13 in contact with chain 2, resulting in flight 3 in trough 4 moving the load towards and into the main line shaker conveyer trough 1. Now when the reverse and quick stroke occurs the ratchet mechanism backs up or unwinds to permit one of the pawls 11 to secure another contact with sprocket 12. The illustrated mechanism shows a ratchet with three pawls, but I do not confine my invention to three pawls. Any number may be used, and springs to actuate the pawls may be used if desired.

One of the weak points of the shaker conveyer is its inability to carry the load up any except a very slight grade. Because of this weakness the discharging end must be almost on a level with the entire length which may be as much as three hundred feet. In Fig. 3 and Fig. 4 I show my auxiliary ratchet operated conveyer at the discharging end of the shaker conveyer in an up grade position. I utilize the same forward and backward stroke of the shaker conveyer to produce a forward movement only in my auxiliary but arrange the cable, pulleys, drums and ratchet differently as follows; in Fig. 3 and Fig. 4, cable 5' is fastened at 6' by any suitable means to trough 1. Pulleys 7' are fastened by any suitable means to supports 20. Pulleys 16, 17 are on shafts 18 held in position by brackets or arms 19. The ratchet mechanism is located under the trough of the auxiliary conveyer. Cable 5' is actuated by the forward and backward movement of the shaker conveyer trough 1 and produces the same ratchet movement as previously explained with reference to Fig. 1 and Fig. 2.

Having described my invention I claim:

In a conveyer system, a shaker chute, an endless chain conveyer adapted to feed to said shaker chute, guide pulleys and drums mounted adjacent said chain conveyer, a chain sprocket connected with said drums and engaging said endless chain to drive same, pawl and ratchet connections between said drums and chain sprocket, a cable attached at both ends to the shaker chute, the intermediate portion being guided around said guide pulleys and drums so as to rotate the latter.

WILLIAM S. WILLIAMS.